United States Patent

[11] 3,601,036

| [72] | Inventor | Henry Von Kohorn |
| | | Pecksland Road, Greenwich, Conn. 06830 |
| [21] | Appl. No. | 5,683 |
| [22] | Filed | Jan. 26, 1970 |
| [45] | Patented | Aug. 24, 1971 |

[54] BARBECUE
9 Claims, 11 Drawing Figs.

[52] U.S. Cl. ..................................................... 99/339,
99/400, 99/425, 99/447
[51] Int. Cl. ......................................................... A47j 37/07
[50] Field of Search ............................................ 99/339,
340–341, 345–346, 352, 393, 397, 400, 419–420,
421–422, 425, 443–444, 445–446, 447–448, 450;
126/9, 11, 25, 25 A, 25 B

[56] References Cited
UNITED STATES PATENTS

| 2,302,984 | 11/1942 | Tollzien................... | 126/9 |
| 2,833,906 | 5/1958 | Wingo...................... | 99/443 R |
| 2,898,846 | 8/1959 | Del Francia............. | 99/443 R |
| 2,900,897 | 8/1959 | Fisher...................... | 99/340 |
| 3,267,924 | 8/1966 | Payne...................... | 99/446 X |
| 3,330,204 | 7/1967 | Little....................... | 99/340 X |
| 3,359,887 | 12/1967 | Cleveland................ | 99/339 UX |
| 3,444,805 | 5/1969 | Happel et al............ | 99/446 X |

*Primary Examiner*—Walter A. Scheel
*Assistant Examiner*—Arthur O. Henderson
*Attorney*—Alfred E. Miller ABSTRACT: A portable barbecue having a central open grill and a surrounding hot plate or griddle adjustably positioned above a housing accommodating a source of heat. A compartment is formed in the bottom of the housing to accommodate food drippings and partitions surround the compartment to prevent direct radiation from the heating elements toward the food drippings. A fume- and exhaust-removing device is adjustably secured in a spaced warming shelf and conducts the exhaust fumes laterally away from the barbecue.

Patented Aug. 24, 1971
3,601,036
3 Sheets—Sheet 1
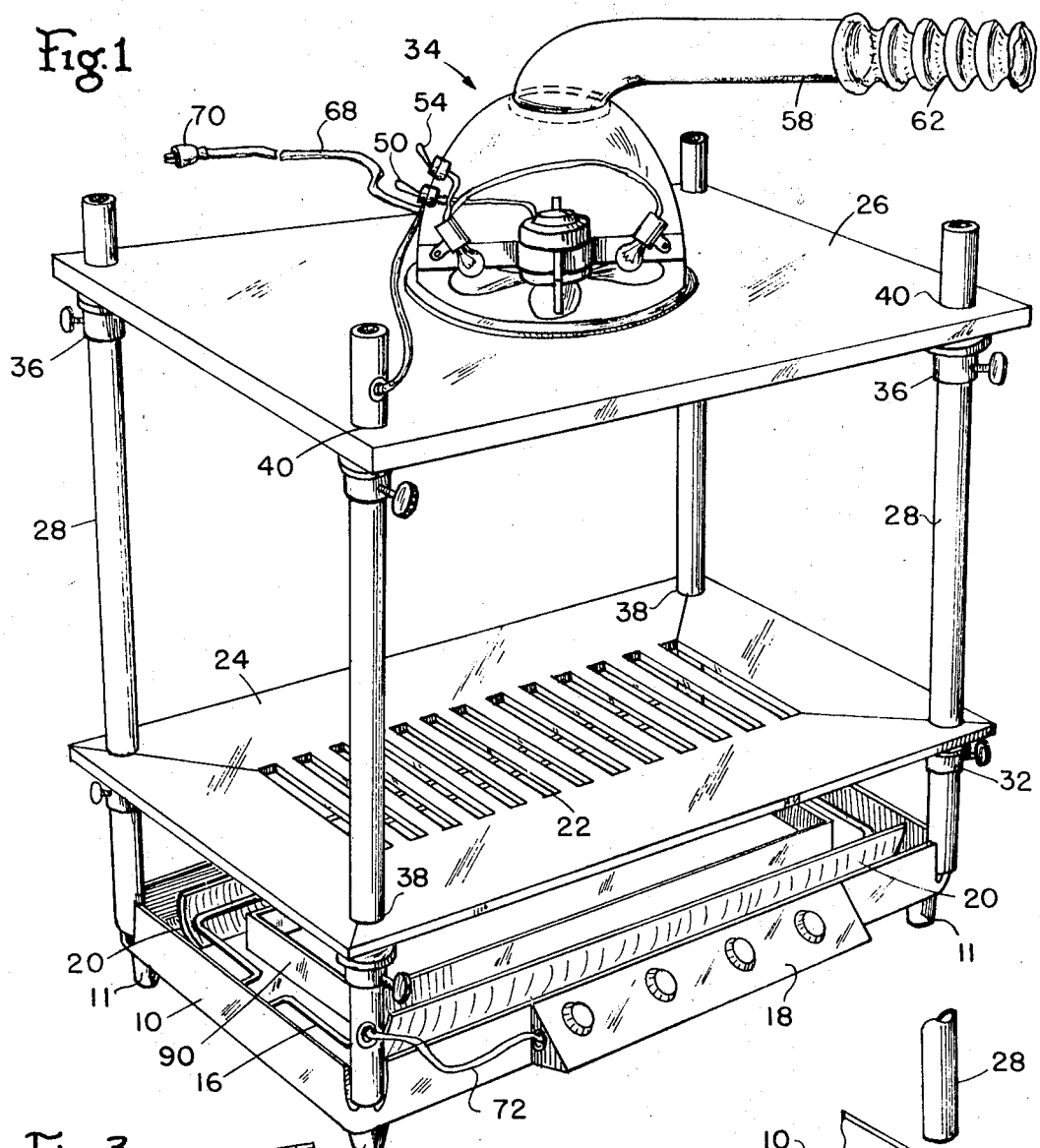
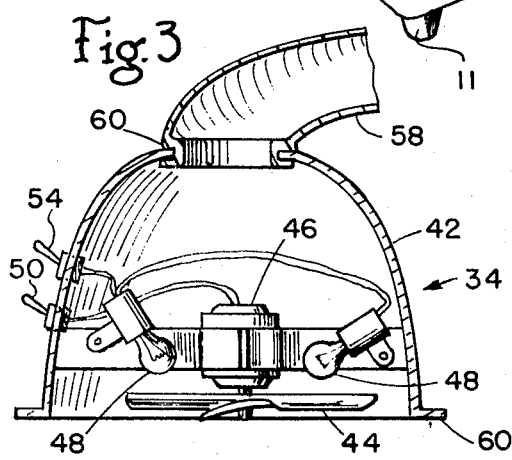
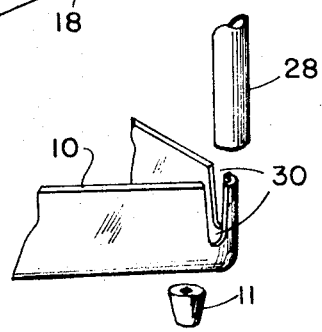
INVENTOR.
HENRY VON KOHORN Patented Aug. 24, 1971
3,601,036
3 Sheets-Sheet 2
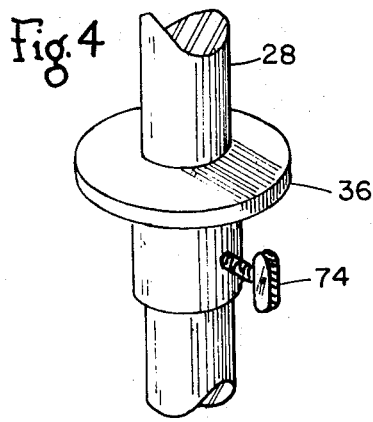
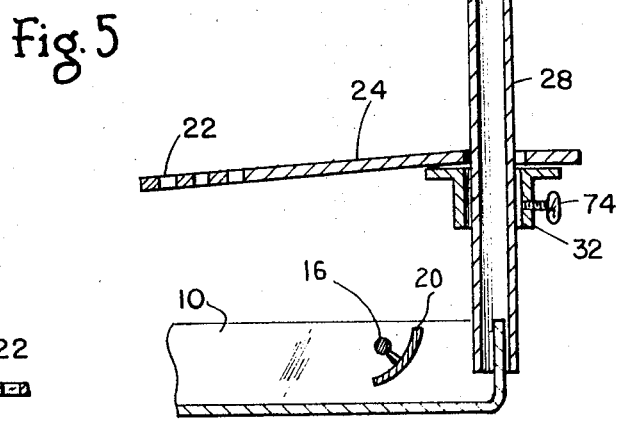
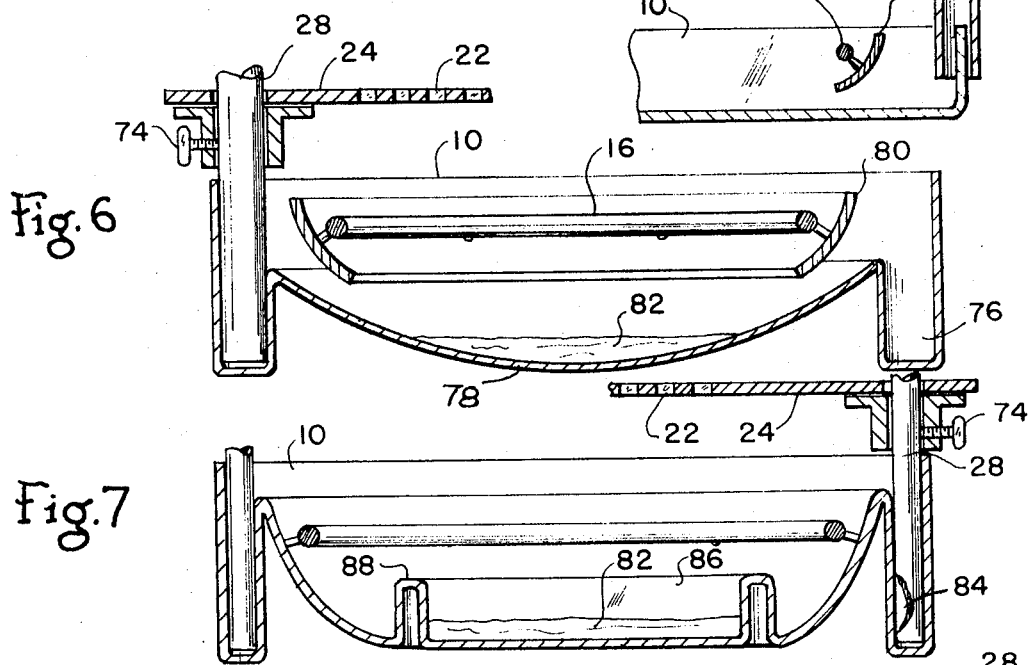
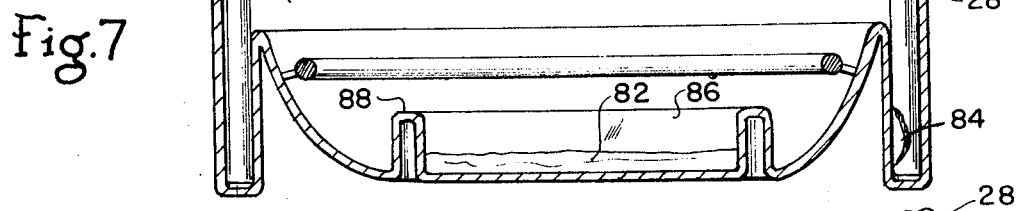
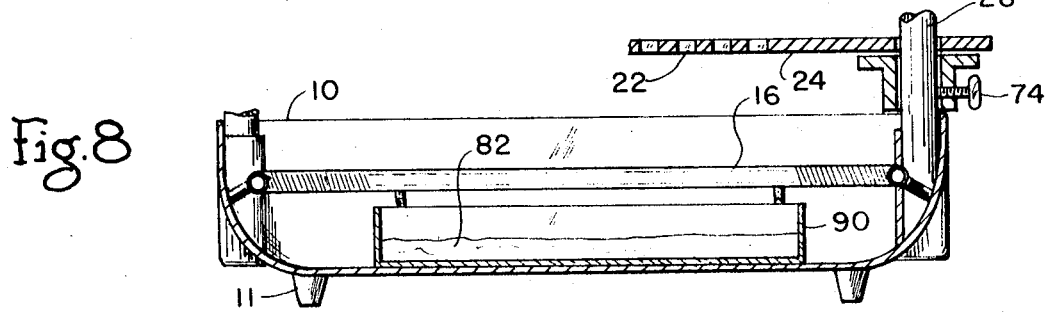
*INVENTOR.*
HENRY VON KOHORN Patented Aug. 24, 1971
3,601,036
3 Sheets-Sheet 3
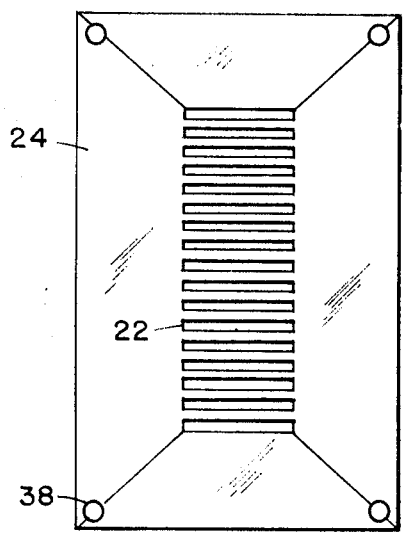
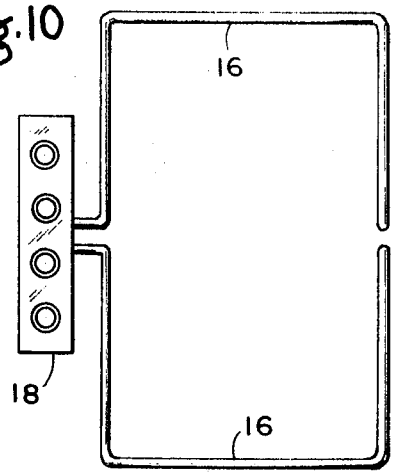
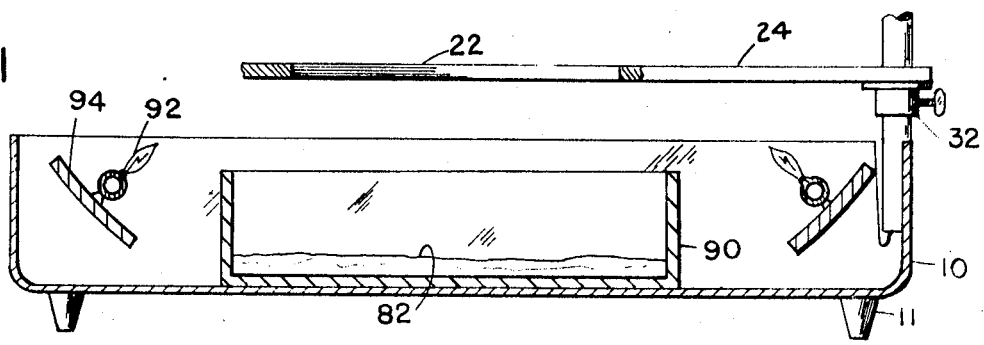
INVENTOR.
HENRY VON KOHORN

3,601,036

BARBECUE

STATEMENT OF THE INVENTION

The present invention relates to a portable barbecue suitable for outdoor and indoor use which can be easily disassembled and store and which permits persons seated around the assembled barbecue to individually cook and eat the food and to carry on a conversation while facing each other.

It is an object of the present invention to provide a central cooking device designed so as to be capable of being placed on a table, with heating means for a central open grill and a surrounding hotplate or griddle.

A further object of the present invention is to provide a cooking device consisting of relatively few components which may easily be assembled and disassembled and stored away in a minimum amount of space.

It is another object of the present invention to reduce the amount of cooking odors and fumes when using the device indoors by preventing drippings from food bursting into flame, and to remove fumes and odors through a fan and exhaust arrangement, extending laterally from the barbecue.

The above and other features, objects and advantages of the present invention will be fully understood from the following description considered with the accompanying drawings.

FIG. 1 is a perspective view of a portable barbecue device constructed in accordance with the teachings of the present invention;

FIG. 2 is a perspective view of a detail of construction of the housing and upright of FIG. 1;

FIG. 3 is a sectional view of the fume and exhaust removal device used with the present barbecue;

FIG. 4 is a perspective view of a spacer and a corresponding upright for the present barbecue;

FIG. 5 is a sectional view of a part of the housing, heating element, reflector and spacer on an upright;

FIG. 6 is a sectional view of the housing, with heating means and reflector, constructed in accordance with the teachings of the present invention;

FIG. 7 is a sectional view of another embodiment of the invention which is a variant of the structure shown in FIG. 6;

FIG. 8 is a sectional view of another embodiment of the invention which is another embodiment of the structure shown in FIG. 6;

FIG. 9 is a top plan view of the grill, griddle and holes for the uprights;

FIG. 10 is a diagrammatic view of two separate heating elements for the present barbecue; and FIG. 11 is a sectional view of a further embodiment of the present invention shown in FIG. 6 having gas heating elements.

FIG. 1 illustrates a housing 10 which is open at the top and rests on spaced legs 11. The open top of the housing 10 is at least partially covered by means of a central grill 22 and a griddle 24 outwardly extending from said grill 22. Mounted inside housing 10 is a heating element 16, which may comprise several independent sections. The sections of heating element 16 can be individually controlled by controls 18. The heating element 16 may be constituted of rods which are heated by passing a current through them, or as one alternative, by means of spirally shaped wires, heated in a like manner. The current passed through the sections of the heating elements may be turned on and off and also regulated through controls 18 which may include a timing device (not shown).

Reflectors 20 are mounted adjacent to heating element 16 in order to direct the heat primarily towards the open grill 22 which is surrounded by a substantially imperforate griddle 24.

A substantially horizontal warming shelf 26 is located above grill 22 and griddle 24. The warming shelf 26 additionally supports a fume removal unit 34. The latter is shown in detail in FIG. 3, and described hereinafter.

Both the griddle 24 and the warming shelf 26 are supported by standards or uprights 28. Uprights 28 rest on housing 10 as shown as one embodiment in detail in FIG. 2. According to this embodiment the uprights 28 are constituted of hollow tubes which fit into slots 30 in the corners of housing 10.

It should be noted that the term grill as used herein is intended to refer to an essentially perforated cooking surface and the term griddle is intended to refer to an essentially imperforate cooking surface.

The distance between griddle 24 as well as the grill 22 and the heating element 16 can be adjusted by means of spacers 32, the latter being shown in detail in FIGS. 4 and 5. The distance of the warming shelf 26 together with supported fume removal unit 34 above heating element 16 can also be adjusted by means of spacers 36, which may be identical to spacers 32. Uprights 28 are mounted in a manner in which they pass through holes 38 in griddle 24 and through holes 40 in warming shelf 26.

FIG. 3 is now referred to, which shows details of the fume removal unit 34 including a housing 42, fan 44, fan motor 46, lamps 48, a switch 50 for the fan motor 46, and a switch 54 for lamps 48. The exhaust duct 58 is connected to housing 42 by means of coupling 60. In a preferred embodiment duct 58 is of rigid material and is connected to flexible duct 62. The rigid duct 58 is bent so that its outlet opening extends laterally beyond the edge or confines of the griddle 24 and may also extend laterally beyond the edge of the table on which the cooking device is placed. This arrangement prevents the flexible duct 62 from touching the heads of the persons sitting around the cooking device and permits the flexible exhaust duct 62 to be positioned so that its outlet opening is near a window, door or other suitable opening in the room, or in any event pointing away from the persons sitting around the cooking device, thereby conducting the fumes and noxious odors away from the persons utilizing the cooking device.

An electric power source is connected to the fan motor 46 and lamps 48 via switches 50 and 54 through wire 68 connected to an outside power source by means of plug 70. Wire 72 also passes through upright 28 to controls 18 and heating element 16.

FIGS. 4 and 5 show details of the spacers 32 and 36 which are adapted to slide up and down the uprights 28 and are fixed in position by means of thumbscrew 74.

FIG. 5 shows a cross section of a part of housing 10, heating element 16 and reflector 20. Housing 10 supports uprights 28 consisting of hollow tubes which in turn support griddle 24 and grill 22 at the desired height by means of spacers 32.

FIG. 6 shows one embodiment of the invention including housing 10 resting on hollow leg receptacles 76 and having a rounded bottom 78 to permit food drippings to accumulate in the central portion of the bottom of the housing. Heating elements 16 are mounted close to reflectors 80, which are shaped so as to prevent heat from the heating elements 16 to radiate directly towards accumulated food drippings 82 in order not to ignite the same. It should be noted that reflectors 80 are shaped so as to reflect most of the heat towards the perforated grill 22.

FIG. 7 illustrates a cross section of another embodiment of the present invention in which housing 10 is provided with hollow leg receptacles 84 into which fit the uprights or legs 28. The bottom of housing 10 is shaped so as to create a compartment 86 in the bottom of the housing 10 to accommodate food drippings 82. The walls of housing 10 are curved at the point where the heating elements 16 are mounted so as to reflect heat towards the upper part of housing 10 and in particular towards the perforated grill 22. The partitions 88 forming part of housing 10 extend high enough to prevent direct radiation from heating elements 16 towards food drippings 82 accumulated at the bottom of compartment or receptacle 86. The substantially imperforate griddle 24 is located directly above the heating elements 16 and extends towards the center sufficiently so that no food drippings can fall on the heating element itself. Food drippings passing through perforated grill 22 are collected in receptacle 86.

FIG. 8 shows a cross section of a further embodiment of the present invention in which housing 10 is supported by legs 11. The walls of housing 10 are partly rounded in such a way that the heat generated from heating elements 16 is reflected upward towards the grill 22 and griddle 24. A removable receptacle 90 is placed in the bottom of housing 10 and food drippings 82 falling through grill 22 are accumulated in receptacle 90 which has sidewalls of sufficient height so that heat from heating elements 16 cannot radiate directly towards food drippings 82. The heating elements in this embodiment are of the spiral wire type.

It should be apparent that an important part of the present invention is that the imperforate griddle 24 prevents any food drippings from falling on heating elements 16 and that food drippings cannot fall anywhere outside the receptacles 78, 86 or 90. It therefore is important that the heating elements are positioned entirely and exclusively under the imperforate griddle in order to prevent food drippings from falling on the heating elements and bursting into flame and causing the attending hazards. It is also important to protect food drippings accumulated at the bottom of the housing from being ignited through direct radiation from the heating elements.

Referring to FIG. 9 a top plan view of grill 22, griddle 24 and holes 38 for uprights is shown. FIG. 10 shows two separate heating elements 16 which can be activated individually or jointly by control 18 and which permits timing and/or reduced consumption of electric power by activating only one of the heating elements in the event there are not enough people sitting around the eating device to warrant generating heat under all of the grill and griddle sections.

FIG. 11 shows another embodiment of the present invention in which a housing 10 is shown supported by legs 11. In the central part of the housing is positioned a removable receptacle 90 for food drippings 82. Heat is generated by gas burners 92 which are connected by the usual piping and control valve means to a gas supply (not shown). The upstanding walls of receptacle 90 prevent heat emanating from gas burners 92 from radiating directly towards and igniting food drippings 82. Reflectors 94 are positioned to direct most of the heat from burner 92 towards the perforated grill 22.

It is important to note that in contrast to other barbecues an essential feature of the present barbecue is that food drippings are collected in a receptacle or in that portion of the bottom of the housing which is underneath at least all of the perforated grill area, and that the heating means are not exposed to any food, waste or liquid dripping through the perforated grill. The barbecue preferably is so designed that the collected food drippings are shielded so that most of the heat from the heating means cannot radiate directly towards the food drippings. The heat preferably is directed towards the perforated grill as a greater heat intensity is usually desired under an open grill in order to achieve the charring of food. In the case of food being cooked on the griddle, the heat retaining property of the substantially imperforate cooking surface has a cumulative effect providing the heat necessary for cooking and charring.

What is claimed is:

1. A portable barbecue comprising in combination an open housing having a receptacle for collecting food drippings in the central part of the receptacle bottom; a central perforated grill located above said housing; a griddle at least substantially surrounding said grill and being substantially imperforate; heating means positioned inside said housing and entirely under the imperforate griddle; and means for shielding food drippings in said receptacle from direct radiation of heat from said heating means.

2. A portable barbecue as claimed in claim 1 having means to direct heat from the heating means in the direction of the grill.

3. A portable barbecue as claimed in claim 1 in which the heating means is an electric heating element.

4. A portable barbecue as claimed in claim 1 in which the heating means is a gas burner.

5. A portable barbecue as claimed in claim 1 further comprising a warming shelf; a fume removal unit supported by said shelf; and means for supporting said shelf and fume removal unit in spaced relationship above the griddle.

6. A portable barbecue as claimed in claim 1 further comprising a warming shelf; a fume removal unit supported by said shelf; means for supporting said shelf and fume removal unit in spaced relationship above the griddle; and a fume removal duct connected to said fume removal unit, the portion of said duct nearest the fume removal unit being of rigid material and curved so that its outlet opening extends laterally beyond the edge of said griddle.

7. A portable barbecue as claimed in claim 5 further provided with means for selectively and individually adjusting the height of the griddle and grill, and of the warming shelf and fume removal unit above the heating means.

8. A portable barbecue as claimed in claim 1 wherein said shielding means are upstanding partitions that are integral with said housing.

9. A portable barbecue as claimed in claim 2 wherein said means for directing heat is a concave reflector positioned adjacent to said heating means, said reflector directing heat toward said grill and griddle.